United States Patent [19]

Hyde et al.

[11] Patent Number: 4,938,320
[45] Date of Patent: Jul. 3, 1990

[54] APPARATUS AND METHOD OF UTILIZATION THEREOF OF A THERMAL COMPENSATING SELF-ADJUSTING VEHICLE WHEEL DRUM BRAKE

[75] Inventors: Robert W. Hyde; Frank W. Brooks, Sr., both of Dayton, Ohio

[73] Assignee: General Motors Corporation, Detroit, Mich.

[21] Appl. No.: 295,273

[22] Filed: Jan. 10, 1989

[51] Int. Cl.$^5$ .............................................. F16D 65/56
[52] U.S. Cl. .............................. 188/79.52; 192/111 A
[58] Field of Search ....................... 188/79.52, 196 BA; 192/111 A

[56] References Cited

U.S. PATENT DOCUMENTS

| | | |
|---|---|---|
| 2,034,922 | 3/1936 | Presnell . |
| 2,072,014 | 2/1937 | Smith ............................... 188/79.52 |
| 2,101,425 | 12/1937 | Brisson ............................. 188/79.52 |
| 2,140,971 | 12/1938 | Roberts ............................. 188/79.52 |
| 2,287,238 | 6/1942 | Goepfrich ......................... 188/79.52 |
| 2,292,018 | 8/1942 | Smith ............................... 188/79.52 |
| 2,570,398 | 10/1951 | Smith . |
| 2,873,006 | 2/1959 | Phillips . |
| 3,068,964 | 12/1962 | Williams et al. . |
| 4,148,380 | 4/1979 | Haraikawa . |
| 4,223,765 | 9/1980 | Turak ........................ 188/196 BA X |
| 4,385,681 | 5/1983 | Conrad et al. . |
| 4,390,086 | 6/1983 | Conrad . |
| 4,706,783 | 11/1987 | Rath et al. ............... 188/196 BA X |
| 4,706,784 | 11/1987 | Shellhause . |
| 4,804,072 | 2/1989 | Michoux et al. .................. 188/79.52 |

FOREIGN PATENT DOCUMENTS 2060094 4/1981 United Kingdom .
2088977 6/1982 United Kingdom .

Primary Examiner—George E. A. Halvosa
Attorney, Agent, or Firm—Ernest E. Helms

[57] ABSTRACT

A thermal compensating self-adjusting vehicle wheel drum brake apparatus and method is provided including a wheel cylinder, a plate for mounting the wheel cylinder, an adjuster strut with a star wheel for adjustably extending a pair of brake shoes. An adjuster pawl is provided for turning the adjuster star wheel. The adjuster pawl is inserted within an aperture of one of the shoes. A thermal elongating stop extendible at a predetermined temperature contacts and wedges the adjuster pawl to prevent pivotal motion thereof whenever the temperature of the brake is above a predetermined value.

5 Claims, 3 Drawing Sheets

APPARATUS AND METHOD OF UTILIZATION THEREOF OF A THERMAL COMPENSATING SELF-ADJUSTING VEHICLE WHEEL DRUM BRAKE

FIELD OF THE INVENTION

The field of the present invention is that of apparatus and methods of utilization thereof of automotive drum brakes with self-adjusting shoes.

DISCLOSURE STATEMENT

It is known in the art to provide automotive drum brakes with self-adjusting brake shoes. An understanding of a conventional self-adjusting automotive brake can be gained by a review of "Theory and Diagnosis Manual Brake Systems", April 1987 Delco Moraine, pages 4-22, 4-23, 4-24 and 4-25.

Due to the down sizing of vehicles to meet government fuel economy standards, drum brakes have increasingly been designed to be smaller thereby contributing less weight to the vehicle. Providing a brake with less mass decreases the heat dissipation capabilities of the brake thereby providing greater potential for heat build up. The lower capabilities of heat dissipation causes the drum of the brake to undergo more thermal expansion than what was the prior case. Therefore, some mechanism must be added to the brake to prevent the brake shoes from being adjusted to meet the dimensions of the drum when the drum is undergoing thermal expansion, so that when the drum cools down the brake shoes will not be adjusted to a position causing the shoes to drag on the drum.

To prevent the occurrence of the above, several techniques have been utilized. One technique is disclosed in Smith U.S. Pat. No. 2,570,398. In Smith the adjuster pawl is fabricated from a bimetallic strip which bends away from an adjuster star wheel when heated. A disadvantage of the Smith type adjuster pawl is the adjuster pawl itself must be fabricated from the bimetallic material exposing the bimetallic material to the adverse consequences of contact with the star wheel.

An alternative technique is to have a brake with an automatic adjuster including a pawl and ratchet (with an inclusive star wheel) mechanism wherein the adjuster includes a bimetallic strip arranged to provide a spring force against the star wheel disengage the pawl from the ratchet when a predetermined temperature is obtained. The pawl is formed on a lever pivotally connected with one of the shoes of the brake and the bimetallic strip is connected to the pawl lever. Again, one of the major disadvantages of the above-described adjuster mechanism is that the bimetallic strip must make contact with the star wheel (when the brake is heated) exposing the bimetallic strip to the adverse conditions of contact with the star wheel. Furthermore, the bimetallic strip must provide a continual force against the pawl lever whenever the brake drum is heated.

Another technique is to provide a vehicle drum brake having a bimetallic element incorporated into the adjuster strut to expand the strut when the drum thermally expands, and to contract the strut when the drum thermally contracts. The disadvantage of expandable strut technique of providing thermal compensation is that a standard adjuster strut cannot be utilized, since bimetallic element must be incorporated into the strut mechanism itself.

Still another technique is to provide thermal compensation is to provide a strut in a form of a two part assembly. A primary assembly compress a plate which extends between the brake shoes. A secondary assembly is provided in the form of a bell crank lever. The bell crank lever (mounted to the primary plate) is pivoted to adjust the length of elongation of the strut. A shape memory effect material element is utilized to expand and provide a continuous force against the bell crank lever to prevent the rotation thereof when the brake drum is heated. A disadvantage of this type assembly is that the shape memory effect material element utilized must provide a relatively high and continuous force to prevent the pivotal movement of the secondary strut member under heated conditions.

Additionally, Shellhause U.S. Pat. No. 4,706,784, commonly assigned, provides an adjuster assembly with thermal compensation. However, the Shellhause adjuster assembly requires a more complex strut mechanism to be utilized.

SUMMARY OF THE INVENTION

The present invention provides a drum brake with self-adjusting shoes with thermal compensation that is an alternative to the aforedescribed thermal compensating self-actuating brakes. Additionally the alternative provided by the present invention allows a more simplified brake design wherein the thermal compensating element does not have to make contact with a star wheel of an adjuster strut or provide a major or continuous spring force to resist movement of an adjuster pawl or star wheel.

It is an desire of the present invention to provide an apparatus and method of utilization thereof of a thermal compensating self-adjusting drum brake.

It is an object of the present invention to provide a thermal compensating self-adjusting vehicle wheel drum brake with primary and secondary shoes, one of the shoes having a aperture with a pivoting surface, the brake including a wheel cylinder for moving the shoes to actuate or to relieve the brake, a plate means for mounting the wheel cylinder and the shoes, an adjuster strut including a star wheel for adjustably extending the distance between the shoes, a compliantly biased adjuster pawl for turning the adjuster star wheel with a portion inserted and mated within the shoe aperture for pivotal movement with respect to the shoe upon movement of the shoes in a predetermined direction, and a thermal elongating stop means with a part for insertion within the shoe aperture extendible at a predetermined temperature for contacting and wedging the adjuster pawl and preventing the pivotal motion of the same whereby the adjuster pawl can pivot to turn the star wheel when the brake shoes are moved in a given predetermined direction and the adjuster pawl is prevented from pivotal motion by the stop means when the shoes are moved in the predetermined direction when the temperature of the brake exceeds a predetermined temperature.

It is an object of the present invention to provide a thermal compensating self-adjusting vehicle wheel drum brake with primary and secondary shoes, one of the shoes having an aperture with a pivoting surface, the brake including a wheel cylinder for moving the shoes to actuate the brake, a plate for mounting the wheel cylinder and the shoes, a return spring connected with the shoes for returning the shoes toward one another upon relieving the brakes, an adjuster strut including a star wheel for adjustably extending the distance between the shoes, an adjuster pawl with a portion pivotally inserted within the aperture and mated with the pivotal surface of the aperture, a spring connected with the pawl for biasing the pawl to pivot the star wheel to cause the adjuster strut to extend, a thermal elongating stop means with a clip for connection with the apertured shoe, the stop means having a thermal elongating portion within the aperture extendible at a predetermined temperature for contacting and wedging the adjuster pawl and preventing pivotal motion of the same whereby the adjuster pawl can pivot to turn the star wheel when the brake shoes are moved in a predetermined direction and the adjuster pawl is prevented from pivotal motion by its the stop means when the shoes are moved in a predetermined direction when the temperature of the brake exceeds a predetermined temperature.

It is an object of the present invention to provide a method of thermally compensating a self-adjusting vehicle wheel drum brake with primary and secondary shoes, one of the shoes having an aperture with a pivoting surface, the method including mounting on a plate a wheel cylinder for actuating the shoes, adjustably extending an adjuster strut including a star wheel to set the distance between the shoes, pivotally connecting with the apertured shoe an adjuster pawl inserted within the apertured shoe and mated with the pivoting surface, compliantly biasing the adjuster pawl to turn the star wheel, thermally elongating a stop means at a predetermined temperature contacting the adjuster pawl and wedging the same to prevent pivoting movement of the adjuster pawl whereby the adjuster pawl can pivot to turn the star wheel when brake shoes are moved is in a given predetermined direction and the adjuster pawl is prevented from pivoting motion by the stop means when the brake shoes are moved in a predetermined direction when the temperature of the brake exceeds a predetermined temperature.

Further objects, desires and advantages of the present invention can become more apparent to those skilled in the art as the nature of the invention is better understood from the accompanying drawings and a detailed description

DETAILED DESCRIPTION OF THE DRAWINGS

Figure 1:
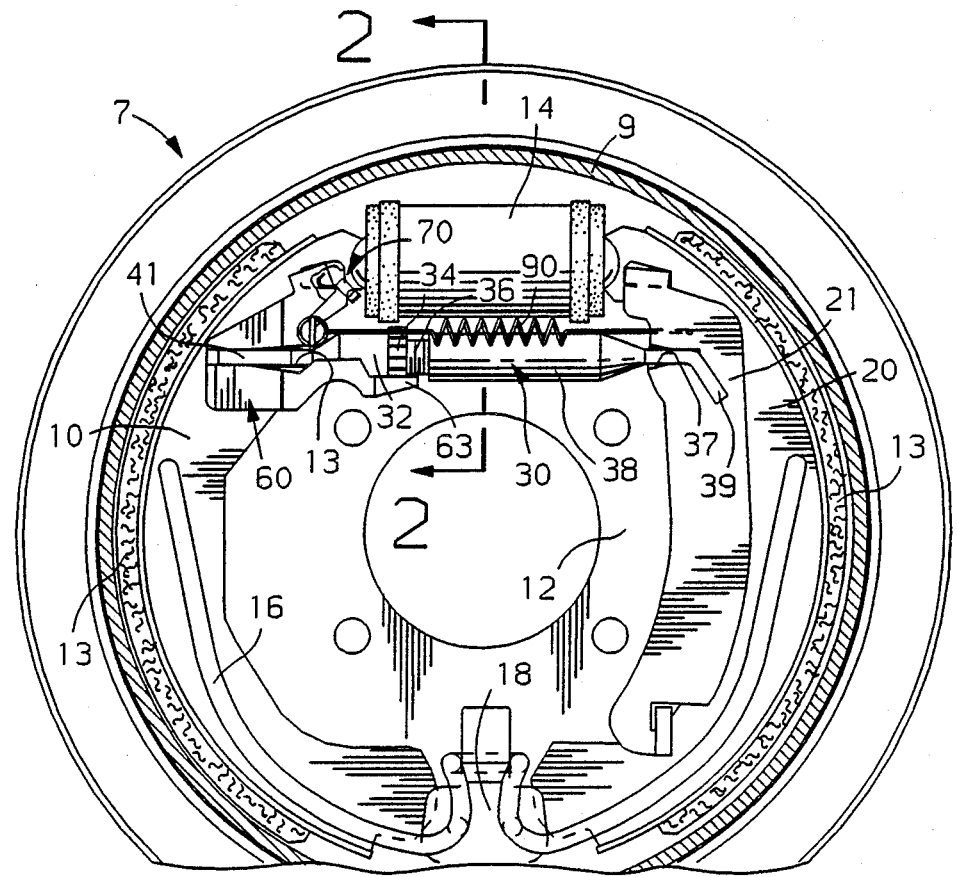
FIG. 1 is a plane elevational view of a preferred embodiment brake according to the present invention.
Figure 2:
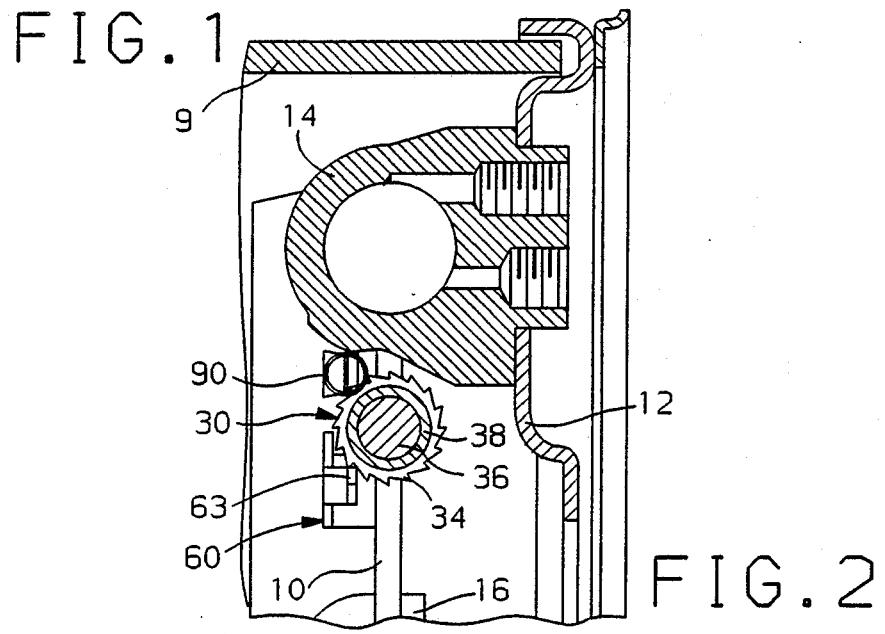
FIG. 2 is a view taken along line 2—2 of FIG. 1.

Referring to FIGS. 1, 2, 3, and 4, the drum brake 7 according to the present invention is associated with a drum 9 (shown in section) which is fixably connected with the wheel (not shown) of the vehicle. The drum brake 7 also has a plate 12 which is boltably connected to a flange of the axle housing of the vehicle. As shown is FIG. 1, the plate 12 is adapted for connection to the rear axle of the vehicle. Drum brake 7 is a leading trailing type brake. However, the present invention can be utilized on other drum brakes such as dual servo. Drum brake 7 has a primary (leading or front) shoe 10 and a secondary (trailing or rear) shoe 20.

In contact with the brake shoes 10, 20 and mounted by the plate means 12 is a wheel cylinder 14 and its associated pistons. Also connected with the brake shoes 10, 20 is a horse shoe return spring 16. For movement of the brake shoes 10, 20 outward, the pistons wheel cylinder 14 are actuated outward. The brake shoes 10, 20 pivot outward with relationship to the plate 12 by virtue of a bottom anchor 18. The return of the primary and secondary shoes inwardly after the wheel cylinder 14 has been relieved is accomplished by the horse shoe return spring 16. Each brake shoe is also mounted to the back plate 12 by virtue of a hold down cup and spring (not shown).

Figure 3:
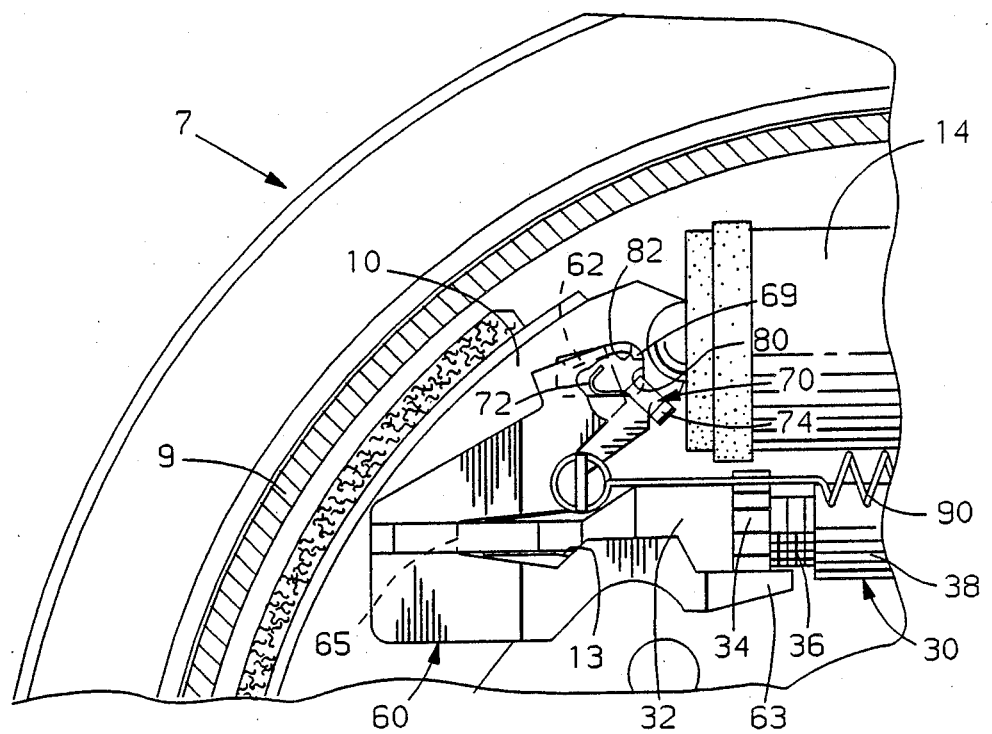
FIGS. 3 and 4 illustrate the operation of the brake illustrated in FIG. 1.

Adjustably setting the distance between the brake shoes 10, 20 along the upper end is an adjuster strut 30. The adjuster strut 30 has at one end a head 32 with a rotatably mounted star wheel 34. The star wheel 34 is fixably connected with a bolt 36. The bolt 36 is received in an inner threaded sleeve nut 38 and rotation of the bolt 36 via the star wheel 34 causes the bolt 36 to be threadably removed from the threaded nut 38. The threaded nut 38 has two fingers 39 (only one shown) which capture the webbing of the secondary brake shoe 20 and a parking brake lever 21 and fit within slots 37 of the same (not shown). In like manner the head 32 has two fingers 41 which capture the webbing of the primary brake shoe 10 and fit within a slot 13 of the primary brake shoe (FIG. 3).

Figure 4:
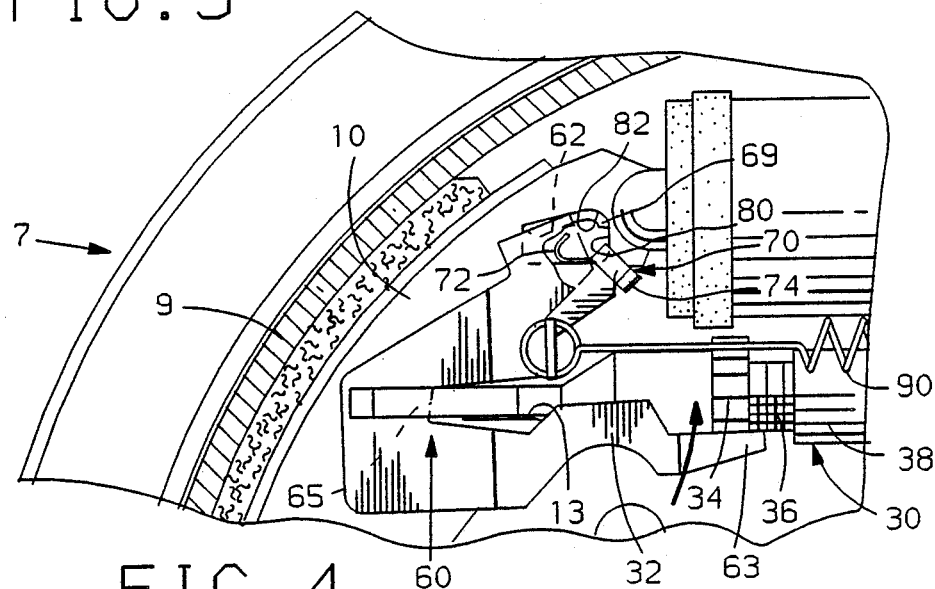

To turn the star wheel 34 upon actuation of the brakes by the wheel cylinder 14 there is provided an adjuster pawl 60. The adjuster pawl 60 has a tip 63 for making contact with the star wheel 34. The adjuster pawl 60 is also captured between the fingers 41 of the adjuster strut head and makes contact with the same via surface 65 (FIG. 4). The adjuster pawl 60 as illustrated has a flaring 62 projecting generally perpendicular from the main body of the adjuster pawl 60. The primary shoe 10 has an aperture 80 for receipt of the inserted flaring 62 of the adjuster pawl with a pivotal contact surface 82 for a rounded portion of the adjuster pawl flaring 69. The contact surface 82 allows the adjuster pawl 60 by its flaring 62 to be pivotally mounted with respect to the primary brake shoe 10.

Figure 5:
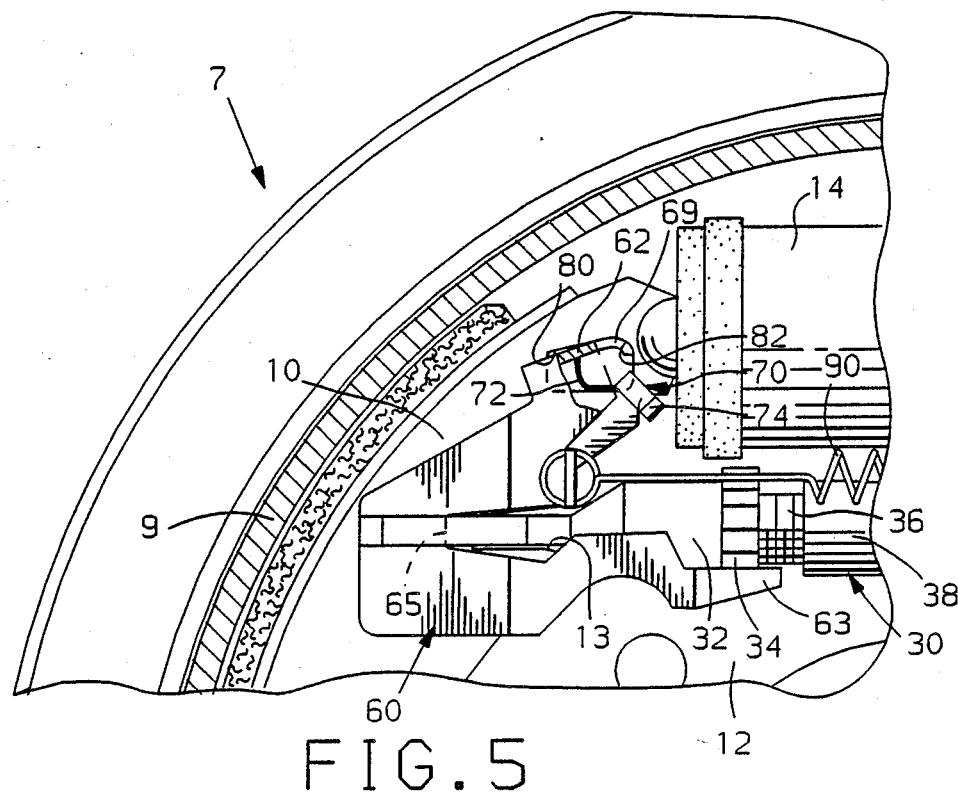
FIG. 5 illustrates operation of the brake illustrated in FIG. 1 at elevated temperature conditions.
Figure 6:
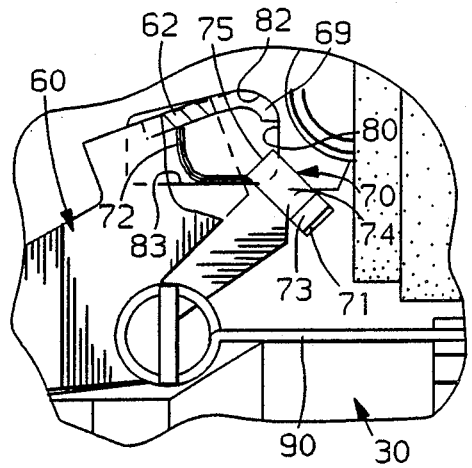
FIG. 6 is an enlargement of a portion of FIG. 5.
Figure 7:
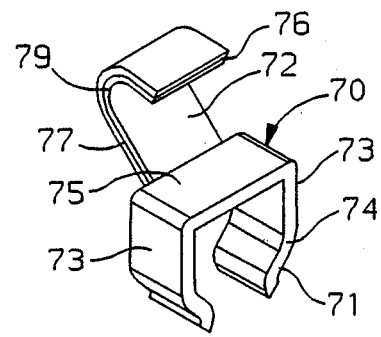
FIG. 7 is a perspective view of the thermal elongating clip utilized the brake shown in FIG. 1.

A stop means or thermal clip 70 has a spring clip connector portion 74 with a flat 75 which projects into the aperture 80 with legs 73 adjacent the webbing of the primary shoe 10. Lower clip section 71 locks the thermal clip 70 to the primary shoe 10. The other embodiments of the present invention may have the clip 70 connected to the shoe 10 by a fastener. A bimetallic hook to column portion 72 of the clip 70 has a linear portion 77 which is adjacent a surface 83 of the aperture 80. When heated to a predetermined temperature curved portion 79 of the hook angularly extends to the position shown in FIGS. 6 and 5. The hook portion is usually comprised of bimetallic or a shape memory effect material and will typically extend outward to design criteria at 300 degrees. However, in normal circumstances, even when extended hooked portion 79 is extended by the head of the brake 7, hooked portion 79 will not make contact with adjuster flaring 62 when the cylinder 14 is nonactivated.

Coil spring 90 is connected between the primary 10 and secondary 20 brake shoes above the adjuster strut 30 and provides a compliant means of biasing of the adjuster pawl 60 against the star wheel 34. The spring 90 biases the adjuster pawl 60 to push upward (as shown by the arrow of FIG. 4) on the star wheel 34. It is noted that by placing the adjuster pawl spring 90 below the point of pivotal connection of the adjuster pawl 60 with the primary brake 10 shoe causes the spring 90 to aid the return spring 16.

In operation the adjuster strut 30 will be set at the factory to determine the minimum distance between the primary 10 and secondary 20 brake shoes when the wheel cylinder 14 is not actuated. Upon actuation of the brake 7 when the vehicle is moving in a predetermined direction the primary 10 and secondary 20 shoes will be pushed outward by the wheel cylinder 14 causing the shoe linings 13 to contact the wheel drum 9. If adjustment of the brake 7 is not necessary, the adjuster pawl 60 which is spring biased against the star wheel 31 will pivot tip 63 upward a slight or insignificant amount since the adjuster pawl surface 65 is in contact with the webbing of the fingers 41 of the strut. Therefore, the star wheel 34 will not be rotated. However, as the linings 13 become worn, the adjuster pawl surface 65 will be further away from the fingers of the webbing of the adjuster fingers 65 allowing the spring 90 to cause the adjuster pawl 60 to pivot as shown (FIGS. 3 and 4) counterclockwise on the star wheel 34, causing the star wheel 34 (and connected bolt 36) to be rotated outward from the threaded nut 38 lengthening the strut 30. Therefore, the minimum distance between the primary 10 and secondary 20 shoes will be adjusted outward. The adjustment of the length of strut 30 will occur when the wheel cylinder 14 is activated with the vehicle proceeding in a forward or rearward direction.

Repeated or forceful operation of the brake 7 will cause the brake 7 to be heated. When the curved portion 79 of the clip 70 is elongated, the adjuster pawl flaring 62 will contact the thermal clip 90 (upon activation of the brake 7) and be wedged by the same. The adjuster pawl 60 is now prevented from pivotal motion with respect to the primary shoe 10. Therefore, upon activation of wheel cylinder 14 the star wheel 34 cannot be turned.

The clip 70 has an end surface 76 which makes contact with the adjuster pawl flaring 62 when the curved portion 79 extends. Therefore, the force transmitted between the clip 70 and the adjuster pawl flaring 62 will tend to travel through curved portion 79 as a force transmitted through a column. If desired, curved portion 79 can be configured in a manner that end surface 76 will perpendicularly contact the adjuster pawl flaring 62 to maximize the column force transmittal effect. Upon a reduction in temperature of the brake 7 the thermal clip curved portion 79 will retract to the previous position to again allow pivotal movement of the adjuster pawl 60 to allow adjustment of the strut 30.

The present invention is advantageous in that the clip 70 does not make contact with the star wheel 34 or with nuts 36. Contact between the adjuster pawl 60 and the star wheel 34 is virtually or completely eliminated when the brake 7 is heated. Instead of having a part with very close tolerances, the addition simple clip 70 can be utilized to thermal compensate the adjuster mechanism of the brake. Additionally the thermal clip 70 does not have to project a force against the adjuster pawl 60 but rather acts as a wedge preventing movement of the pawl 60 (only upon activation of the wheel cylinder 14). Therefore, the thermal elongating portion or hook 69 does not have to provide a force which continually overcome the force of spring 90 to prevent pivotal movement of the adjuster pawl 60.

The present invention provides a method including of thermally compensating a self-adjusting vehicle wheel drum brake 7 with primary 10 and secondary 20 shoes, one of the shoes having an aperture 80 with a pivoting surface 82, the method including the following steps:

1. Mounting on a plate 12 a wheel cylinder 14 for actuating the shoes 10, 20;
2. Adjustably extending an adjuster strut 30 including a star wheel 34 to set the distance between the shoes 10, 20;
3. Pivotally connecting with the apertured shoe an adjuster pawl 60 inserted within the apertured shoe and mated with the pivoting surface 82;
4. Compliantly biasing 90 the adjuster pawl 60 to turn the star wheel 34;
5. Thermally elongating a stop means 70 at a predetermined temperature contacting the adjuster pawl 60 and wedging the same to prevent pivoting movement of the adjuster pawl 60 whereby the adjuster pawl 60 can pivot to turn the star wheel 34 when brake shoes 10, 20 are moved is in a given predetermined direction and the adjuster pawl 60 is prevented from pivoting motion by the stop means 70 when the brake shoes 10, 20 are moved in a predetermined direction when the temperature of the brake 7 exceeds a predetermined temperature.

While an embodiment of the present invention has been explained, it will be readily apparent to those skilled in the art of the various modifications which can be made to the present invention without departing from the spirit and scope of this application as it is encompassed by the following claims.

The embodiments of the invention in which an exclusive property or privilege is claimed are defined as follows:

1. A thermal compensating self-adjusting vehicle wheel drum brake with primary and secondary shoes, one of said shoes having an aperture with a pivoting surface, said brake in combination comprising:
    a wheel cylinder with pistons contacting said brake shoes, said wheel cylinder pistons actuating said brake by moving said shoes outward;
    a plate means for mounting said wheel cylinder and said shoes to said vehicle;
    an adjuster strut positioned between said shoes including a rotatable star wheel for extending said strut thereby adjustably extending the distance between said shoes;
    a compliantly biased adjuster pawl for contacting said star wheel and for turning said adjuster star wheel with a portion inserted and mated within said shoe aperture for pivotal movement with respect to said shoe upon movement of said shoes in a predetermined direction; and
    a thermal elongating stop means with a column portion for insertion within said shoe aperture angularly extendible at a predetermined temperature for contacting and wedging said adjuster pawl portion within said aperture for providing a column force transmittal effect and preventing the pivotal motion of the same whereby said adjuster pawl can pivot to turn said star wheel when said brake shoes are moved in a given predetermined direction and said adjuster pawl is prevented from pivotal motion by said stop means when said shoes are moved in said predetermined direction when the temperature of said brake exceeds a predetermined temperature.

2. A brake as described in claim 1 wherein said stop means has a clip allowing said stop means to be connected with said shoe within said aperture.

3. A thermal compensating self-adjusting vehicle wheel drum brake with primary and secondary shoes, one of said shoes having an aperture with a pivoting surface, said brake in combination comprising:
- a wheel cylinder with pistons contacting said shoes, said wheel cylinder pistons actuating said brake by moving said shoes outward;
- a plate for mounting said wheel cylinder and said shoes to said vehicle;
- a return spring connected with said shoes for returning said shoes toward one another to relieve said brake;
- an adjuster strut position between said shoes including a rotatable star wheel for extending said strut thereby adjustably extending the distance between said shoes;
- an adjuster pawl with a portion pivotally inserted within said aperture and mated with said pivotal surface of said aperture and a portion for contact with said star wheel;
- a spring connected with said pawl for biasing said pawl to pivot said star wheel to cause said adjuster strut to extend;
- a bimetallic thermal elongating stop means with a clip for connection with said apertured shoe, said stop means having a thermal elongating portion column within said aperture angularly extendible at a predetermined temperature for contacting and wedging said adjuster pawl portion with said aperture for providing a column force transmittal effect and preventing pivotal motion of the same whereby said adjuster pawl can pivot to turn said star wheel when said brake shoes are moved in a predetermined direction and said adjuster pawl is prevented from pivotal motion by its said stop means when said shoes are moved in a predetermined direction when the temperature of said brake exceeds a predetermined temperature.

4. A brake as described in claim 3 which is a leading trailing brake and wherein said primary shoe has said aperture for pivotally connecting with said adjuster pawl and said adjuster spring aids said return spring.

5. A method of thermally compensating a self-adjusting vehicle wheel drum brake with primary and secondary shoes, one of said shoes having an aperture with a pivoting surface, said method in combination comprising:
- mounting on a plate a wheel cylinder having pistons for actuating said shoes;
- adjustably extending an adjuster strut positioned between said shoes including a rotatable star wheel for extending said strut thereby setting the distance between said shoes;
- pivotally connecting with said apertured shoe an adjuster pawl having a portion inserted within said apertured shoe and mated with said pivoting surface;
- compliantly biasing said adjuster pawl to turn said star wheel;
- thermally elongating an angularly extendible stop means at a predetermined temperature contacting said adjuster pawl providing a column force transmittal effect and wedging said pawl portion within said aperture to prevent pivoting movement of said adjuster pawl whereby said adjuster pawl can pivot to turn said star wheel when brake shoes are moved in a given predetermined direction and said adjuster pawl is prevented from pivoting motion by said stop means when said brake shoes are moved in a predetermined direction when the temperature of said brake exceeds a predetermined temperature.

* * * * *